(12) United States Patent
Kwon et al.

(10) Patent No.: US 8,391,484 B2
(45) Date of Patent: *Mar. 5, 2013

(54) METHOD AND APPARATUS FOR PERFORMING VIDEO COMMUNICATION

(75) Inventors: Jae-Hoon Kwon, Seongnam-si (KR); Tae-Sung Park, Suwon-si (KR); Do-Young Joung, Seoul (KR); Jae-Sung Park, Gunpo-si (KR); Yun-Sun Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

This patent is subject to a terminal disclaimer.

(21) Appl. No.: 12/626,719

(22) Filed: Nov. 27, 2009

(65) Prior Publication Data

US 2010/0135490 A1 Jun. 3, 2010

(30) Foreign Application Priority Data

Nov. 28, 2008 (KR) ........................ 10-2008-0120142

(51) Int. Cl.
*H04L 29/06* (2006.01)
(52) U.S. Cl. ....................................... 380/236
(58) Field of Classification Search .................. 380/236
See application file for complete search history.

(56) References Cited

U.S. PATENT DOCUMENTS

| 2007/0157026 | A1* | 7/2007 | Zimmermann | 713/171 |
|---|---|---|---|---|
| 2008/0015859 | A1* | 1/2008 | Novack et al. | 704/246 |
| 2008/0114988 | A1* | 5/2008 | Lisanke et al. | 713/186 |
| 2009/0287929 | A1* | 11/2009 | Kolesnikov et al. | 713/171 |
| 2010/0017618 | A1* | 1/2010 | Golic et al. | 713/186 |

* cited by examiner

*Primary Examiner* — Michael S McNally
(74) *Attorney, Agent, or Firm* — Sughrue Mion, PLLC (57) ABSTRACT

A method for performing video communication is provided. The method includes: creating and saving a bio key using a user's biological information before first and second terminals perform the video communication; establishing a session, wherein the first terminal requests voice communication with the second terminal; exchanging bio keys saved in the respective terminals and saving the same; starting a Secure Real-Time Transport Protocol (SRTP) session, wherein the first and second terminals create a session sharing key using the exchanged bio keys; creating a restored bio key by obtaining the biological information from data received by first and second terminals and performing a user certification by comparing the bio key with the restored bio key.

11 Claims, 5 Drawing Sheets

METHOD AND APPARATUS FOR PERFORMING VIDEO COMMUNICATION

CROSS-REFERENCE TO RELATED APPLICATION

This application claims priority from Korean Patent Application No. 10-2008-0120142, filed on Nov. 28, 2008 in the Korean Intellectual Property Office, the disclosure of which is hereby incorporated by reference in its entirety.

BACKGROUND

1. Field

Methods and apparatuses consistent with the exemplary embodiments relate to a method and an apparatus for performing video communication, and more particularly to performing video communication which encrypts data used in the video communication through a digital key.

2. Description of the Related Art

In general, video communication using Internet protocol networks or wireless networks has been in widespread use. Voice communication is typically concerned with an exchange of voice information between users. However, when a user utilizes video communication, the user can exchange a variety of information using a video or an image. Particularly, in the process of exchanging business information, for example, a blueprint, a video of a portion of a document, a drawing of a product design or the like using video communication, such information may be exposed to an ill-spirited hacker, which can lead to serious damages. Accordingly, security measures for video communication should be taken to protect the information being exchanged.

To provide security for wired or wireless networks, a Public Key Infrastructure (PKI) technology has been widely used. With the PKI technology, a transmitter is able to encode transmitting information using a receiver's private key which is retrieved from the electronic certificate of the receiver. Then, the receiver who receives that information can read the information by decoding the received information using the private key, which is not known to others.

In order to maintain a security system based on the PKI, it has to be confirmed whether the public key, which is open to the public, in fact belongs to the user who is asserting ownership of that key. Such a task can be confirmed through a digital certificate which is issued by a credible third party, i.e., a Certificate Authority (CA) by means of attaching its digital signature to the public key of the owner.

However, the PKI system requires a lot of time and expense to create and manage the public and private keys and issue the digital certificate by the CA. Meanwhile, the user has to save and maintain the information regarding the private and public keys in a disc or memory of the user's terminal. In addition, many users save and maintain the information of others' digital certificates, which consumes huge expenses and is not suitable for video communication. Therefore, there has been a need to develop an encrypting and certifying method suitable for the video communication.

SUMMARY

Exemplary embodiments have been made to solve the above-mentioned problems occurring in the prior art, and provide a method and an apparatus for performing video communication capable of processing a user certification by creating a digital key including biological information of a user.

In accordance with an exemplary embodiment, there is provided a method for performing video communication using terminals to assist the video communication, including: creating and saving a bio key using a user's biological information before first and second terminals perform the video communication; establishing a session, wherein the first terminal requests voice communication from the second terminal; exchanging the bio keys saved in the respective terminals and saving the same; starting a Secure Real-Time Transport Protocol (SRTP) session, wherein the first and second terminals create a session sharing key using the exchanged bio keys; creating a restored bio key by obtaining the biological information from data received by first and second terminals and performing a user certification by comparing the bio key with the restored bio key.

The operation of creating the bio key may include the operation of encoding and decoding the biological information; and creating a digital bio key by extracting featuring information of the biological information.

The operation of creating the bio key may include creating a plurality of bio keys respectively corresponding to a plurality of encoding and decoding methods.

The method may further include the operation of selecting one of the encoding and decoding methods to be employed in the communication amongst a plurality of encoding and decoding methods.

The session sharing key may be created on the basis of a Diffie-Hellman algorithm.

The biological information may include face featuring information extracted from a featuring point of the user's face.

In accordance with another exemplary embodiment, there is provided an apparatus for performing video communication, including: an outer input device that receives voice and video signals; an outer output device that outputs the voice and video signals; an encoding and decoding module that encodes and decodes the voice and video signals transferred from the outer input device and decodes the voice and video signals received through the communication; a biological information extracting part that obtains biological information from the video signal outputted through the encoding and decoding module; a bio key creating part that creates and manages a bio key using the biological information outputted from the biological information extracting part; a session sharing key creating part that manages the creation of a session sharing key using the bio key being created and the bio key received from a terminal of the other party in communication; an encryption certifying part that manages the creation of a restored bio key and certifies the encoding operation; and a telecommunication module transmits and receives packet data being encoded using the session sharing key.

The encoding and decoding module may encode the video signal inputted to create the bio key, and then output the video signal after decoding the same.

The encoding and decoding module may include an encoder and a decoder which perform various encoding and decoding operations, and the bio key creating part may create a plurality of bio keys respectively corresponding to the biological information which are outputted after being encoded and decoded in various ways.

The biological information extracting part may include a facial area recognizing part that scans a facial area included in a video; and a featuring point extracting part that recognizes the featuring point of the face using the geometrical information of the scanned facial area, and extracts the face featuring information with respect to the recognized featuring point of the face.

The encryption certifying part may control the biological information extracting part that extracts the biological information from the data received from the terminal of the other party, and certify an encryption by confirming whether the bio key is the same as the restored bio key.

BRIEF DESCRIPTION OF THE DRAWINGS

The above and other aspects will be more apparent from the following detailed description taken in conjunction with the accompanying drawings, in which.

DETAILED DESCRIPTION OF THE EXEMPLARY EMBODIMENTS

Hereinafter, exemplary embodiments will be described with reference to the accompanying drawings. In the following description, the same elements will be designated by the same reference numerals although they are shown in different drawings. Further, various specific definitions found in the following description, such as specific values of packet identifications, contents of displayed information, etc., are given only to provide a general understanding, and it is apparent to those skilled in the art that the exemplary embodiments can be implemented without such definitions. Further, in the following description of the exemplary embodiments, a detailed description of known functions and configurations incorporated herein will be omitted when it may make the exemplary embodiments rather unclear. Expressions such as "at least one of," when preceding a list of elements modifies the entire list of elements and does not modify each element of the list.

Figure 1:
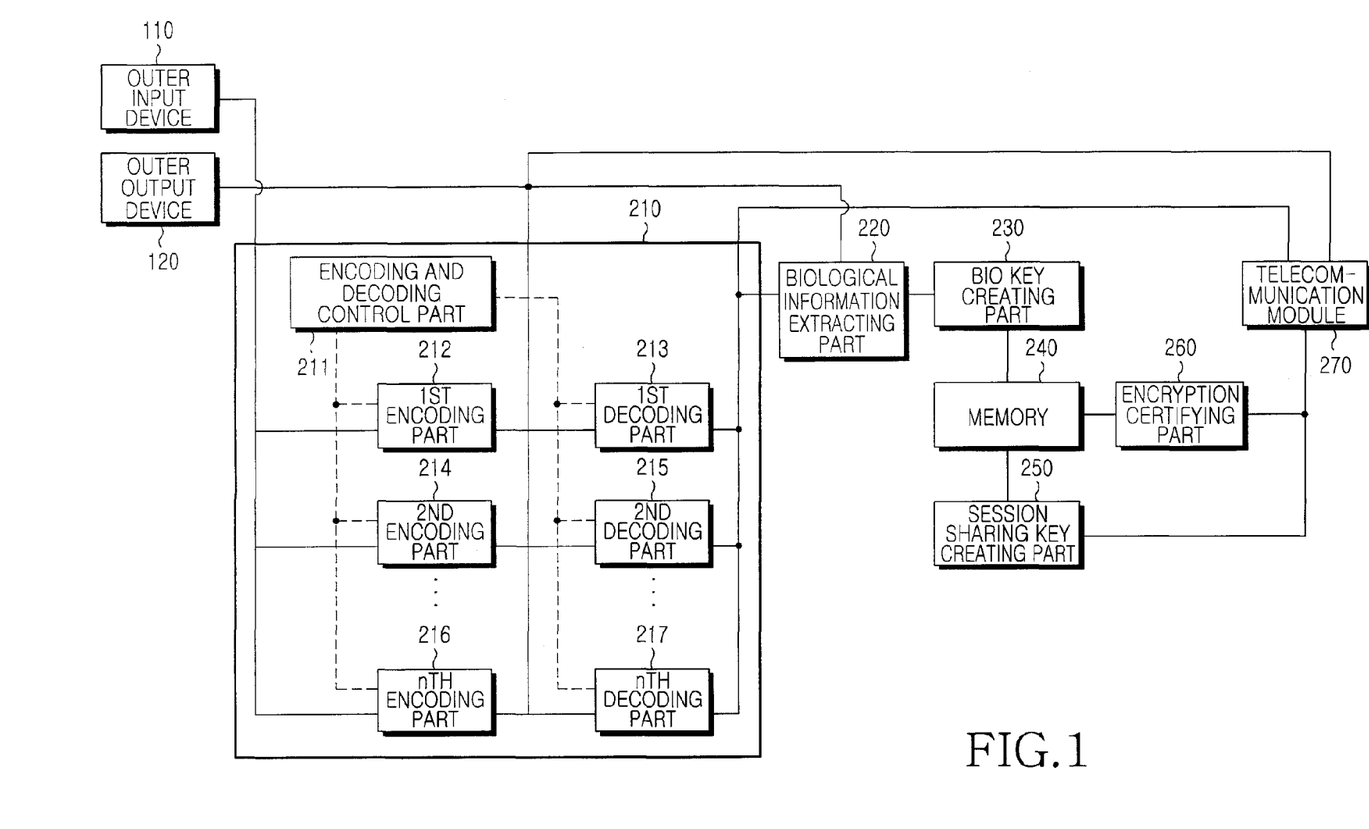
FIG. 1 is a block diagram illustrating a video communication apparatus in accordance with an exemplary embodiment.

FIG. 1 is a block diagram illustrating a construction of a video communication apparatus in accordance with an exemplary embodiment.

Referring to FIG. 1, a video communication apparatus includes an outer input device 110, an outer output device 120, an encoding and decoding module 210, a biological information extracting part 220, a bio key creating part 230, a memory 240, a session sharing key creating part 250, an encryption certifying part 260, and a telecommunication module 270.

The outer input device 110 refers to a device in which a user inputs voice and video signals for a video communication, including a microphone and a camera. The outer output device 120 is designed to output the voice and video signals to the user which are transmitted from another party during the video communication, which includes a speaker and a display device.

The encoding and decoding module 210 encodes the voice and video signals transferred from the outer input device 110 on the basis of a predetermined encoding method, such as G 711, G 729, MPEG 4, H 264 or the like, and then decodes the voice and video signals transmitted through the telecommunication module 270.

Further, the encoding and decoding module 210 includes a plurality of encoding parts 212, 214, and 216, and a plurality of decoding parts 213, 215, and 217, which perform the encoding and decoding operations, respectively corresponding to a variety of encoding and decoding methods which are employed by the video communication apparatus. The encoding and decoding module 210 also includes an encoding and decoding control part 211 which is designed to control the operations of a plurality of encoding and decoding parts 212 to 217.

In the initial operation of a communication, the video communication apparatus is adapted to decide the encoding and decoding method to be used in the communication. In this regard, the encoding and decoding control part 211 selects an encoding part, when it begins communicating, to perform the encoding operation of the voice or video signal generated from the outer input device 110 on the basis of the determined encoding method, and then selects a decoding part to perform the decoding operation on the basis of the determined encoding method.

Furthermore, various encoding and decoding methods can be employed which are assisted by the video communication apparatus of the other party which has performed the communication. The video communication apparatus in accordance with an exemplary embodiment encodes and decodes biological information extracted from the voice or video signal, and then creates a bio key on the basis of the resulting value. Since it cannot recognize in advance which encoding and decoding method has been employed by the video communication apparatus of the other party having performed the communication, the video communication apparatus in accordance with an exemplary embodiment may create a plurality of bio keys each corresponding to a variety of encoding and decoding methods which are used by the video communication apparatus. Therefore, the encoding and decoding control part 211 controls the input of the encoding and decoding parts 212 to 217 so that a plurality of values corresponding to a plurality of encoding and decoding methods can be outputted with respect to the inputted voice or video signal in order to create a plurality of bio keys using the inputted voice or video signal.

The biological information extracting part 220 has an input of the video signal which is outputted from the encoding and decoding module 210 and extracts the biological information representing unique features of each user from the video signal.

The bio key creating part 230 creates a digital key (i.e., bio key) including the biological information extracted by the biological information extracting part 220 and saves the bio key in the memory 240.

The session sharing key creating part 250 transmits the bio key (a first bio key), which has been created and saved in the memory 240, to the video communication apparatus of another party through the telecommunication module, and creates a session sharing key by combining the first bio key and a bio key (a second bio key) received from the video communication apparatus of the other party. Further, the session sharing key creating part 250 saves the second bio key in the memory 240. For instance, the session sharing key creating part 250 can create the session sharing key on the basis of a Diffie-Hellman algorithm.

The encryption certifying part 260 performs the process of encryption certification after the session sharing key is created from the session sharing key creating part 250. The encryption certifying part 260 extracts the biological information from the data after the received packet data has been decoded, and controls the operations of the encoding and decoding module 210, the biological information extracting part 220, and the bio key creating part 230 so as to create the bio key using the extracted biological information. With the control of the encryption certifying part 260, a bio key received from the packet data (referred to as "a restored bio key") is created and saved in the memory 240.

In addition, after the encryption certifying part 260 compares the second bio key which is received to create the session sharing key with the restored bio key, it certifies whether an encryption process is properly performed by confirming that the second bio key matches the restored bio key.

The telecommunication module 270 establishes a session for performing communication with the video communication apparatus of the other party, and then performs the video communication. Particularly, in order to establish the session for performing the communication, the telecommunication module 270 requests a signal from the video communication apparatus of the other party, and performs a negotiation on the encoding and decoding method to be used in the communication. Further, the telecommunication module 270 transmits the encoding and decoding method established through the negotiation to the encoding and decoding module 210, and performs the encoding and decoding operation of the packet data using the session sharing key created through the session sharing key creating part 250.

Figure 2:
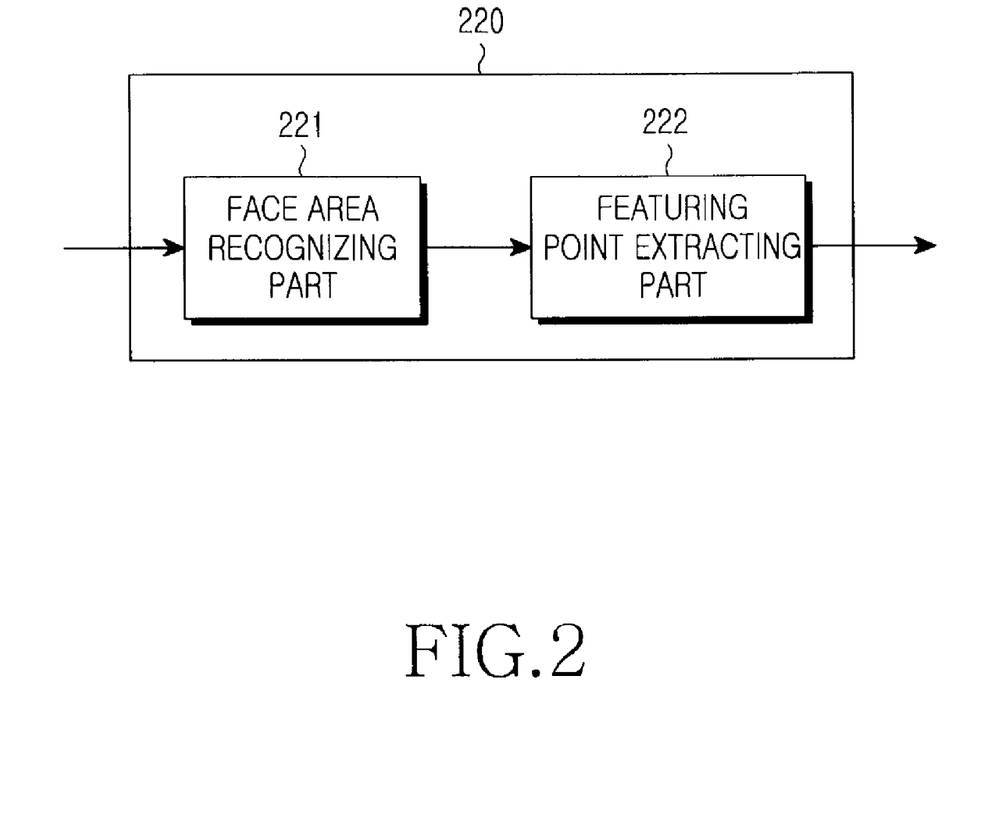
FIG. 2 is a block diagram illustrating a biological information extracting part provided in the video communication apparatus in accordance with an exemplary embodiment.
Figure 3A:
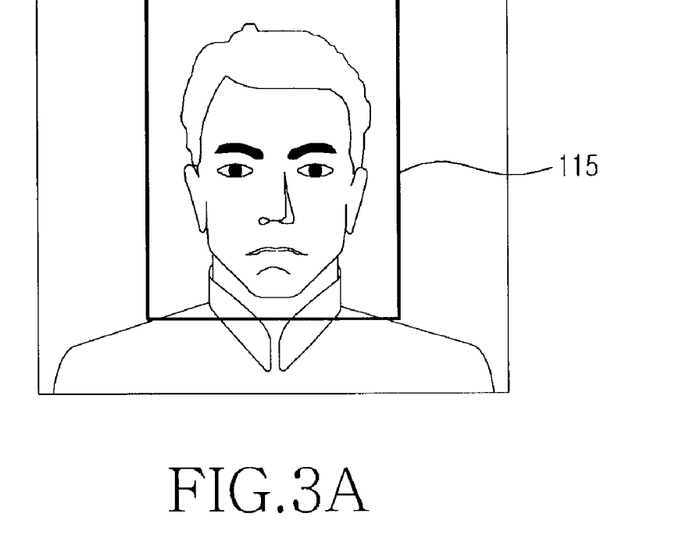
FIG. 3A illustrates a face area perceived by the video communication apparatus in accordance with an exemplary embodiment.
Figure 3B:
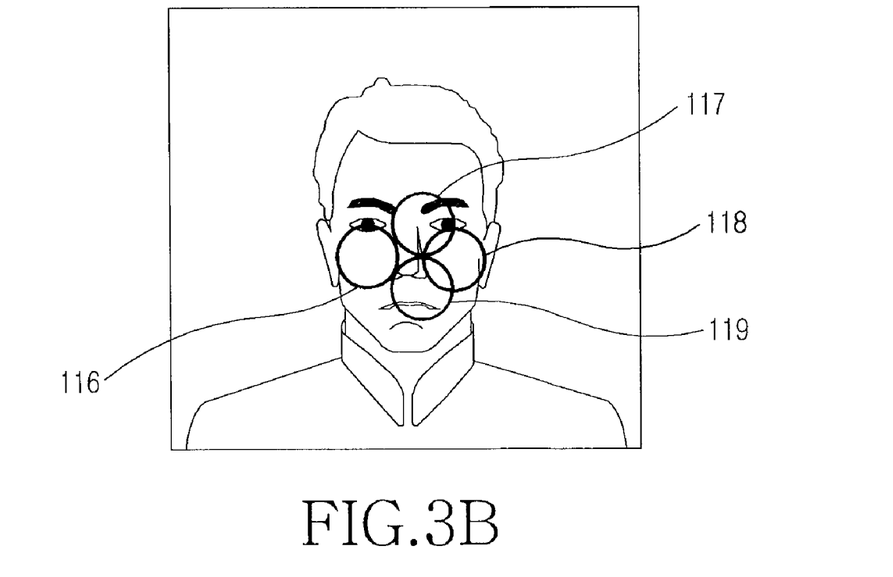
FIG. 3B illustrates a featuring point of the face area extracted by the video communication apparatus in accordance with an exemplary embodiment.

The biological information extracting part 220 may extract the biological information regarding a featuring point existing in the user's face. FIG. 2 is a block diagram illustrating a detailed construction of the biological information extracting part 220 provided in the video communication apparatus in accordance with an exemplary embodiment. Referring to FIG. 2, the biological information extracting part 220 includes a facial area recognizing part 221 and a featuring point extracting part 222. The facial area recognizing part 221 scans the facial area 115 included in the video on the basis of the color, brightness, facial pattern or the like outputted from the encoding and decoding module 210 (refer to FIG. 3A). On the other hand, the featuring point extracting part 222 recognizes the featuring points 116, 117, 118, and 119, where a face, eyes, a nose, a lip or the like is located using the geometrical information of the scanned facial area (refer to FIG. 3B), and then extracts the face featuring information such as the size of the featuring point, ratio, brightness, facial pattern or the like which have been recognized. Consequently, the biological information extracting part 220 outputs the face featuring information as the biological information, and the bio key creating part 230 creates a digital key using the face featuring information.

Hereinafter, the encrypting method of video communication in accordance with an exemplary embodiment will be described by explaining the operation of the video communication apparatus in accordance with an exemplary embodiment.

Before performing video communication, the video communication apparatus creates a bio key and saves it in the memory 240. Whenever performing video communication, the video communication apparatus carries out a user certification using the bio key saved in advance. Accordingly, the video communication apparatus may be operated in a bio key establishing mode or a video communication performing mode. Operations of the video communication apparatus in accordance with the respective modes will be described hereinbelow.

1. Bio Key Establishing Mode

Figure 4:
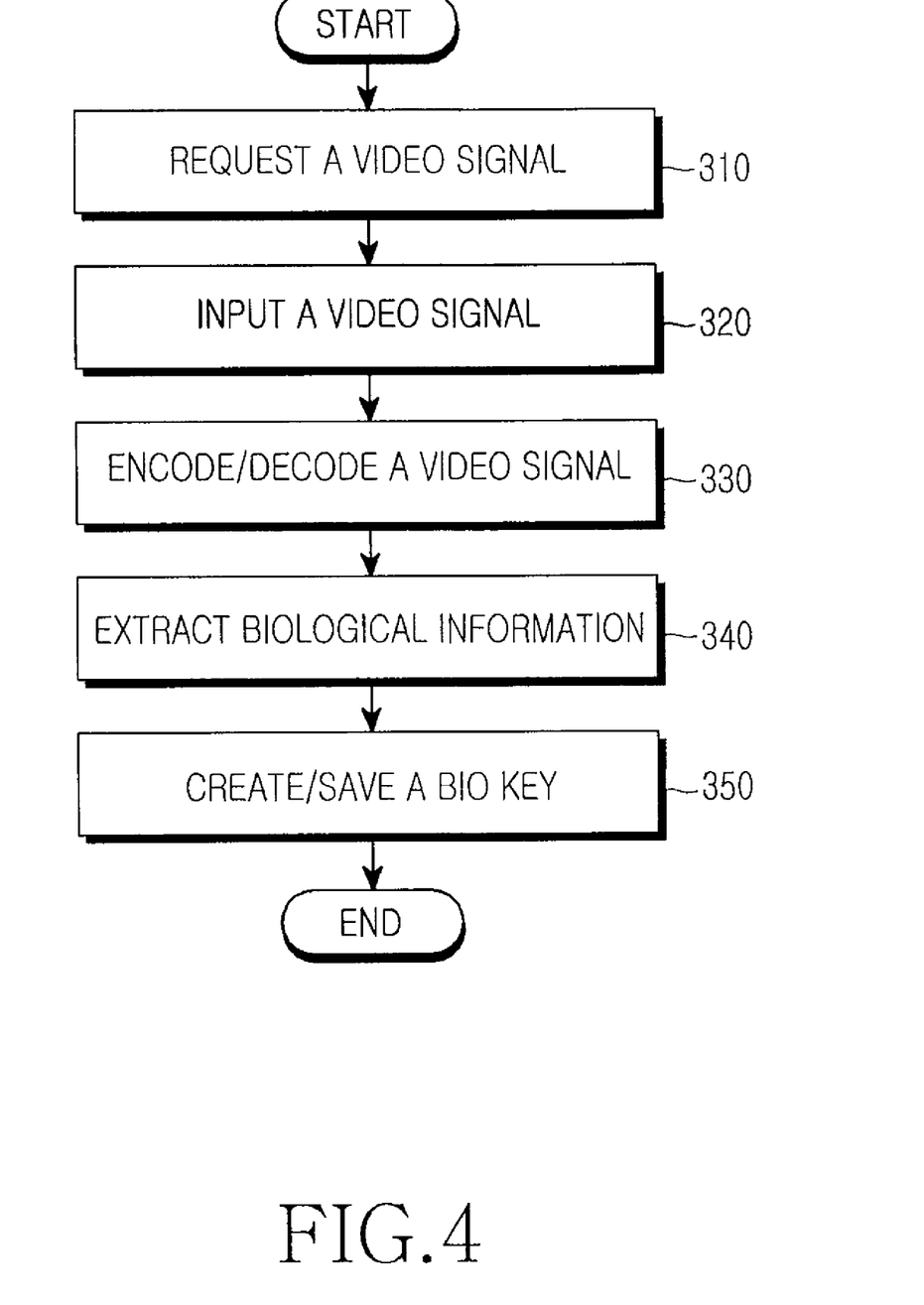
FIG. 4 is a flow chart illustrating a bio key establishing process of a video communication method in accordance with an exemplary embodiment.

FIG. 4 is a flow chart illustrating a bio key establishing process of a video communication method in accordance with an exemplary embodiment. Referring to constructions of the video communication apparatus as described above and FIG. 4, when the user first selects the function of establishing the bio key among the functions of the video communication apparatus, a control part (not shown) requests the user of the video signal to input a video signal through the outer output device 120 (Operation 310) so that the user's biological information may be extracted. In response thereto, the user may input the video signal through the outer input device 110 (Operation 320).

The video signal inputted from the outer input device 110 is transferred to the encoding and decoding module 210. The encoding and decoding module 210 delivers the video signal to the first encoding part 212, controls the first encoding part 212 and the first decoding part 213 to encode and decode the video signal, and outputs the same.

The encoding and decoding control part 211 transmits the inputted video signal to the second encoding part 214, controls the second encoding part 214 and the second decoding part 215 to encode and decode the video signal, and outputs the same.

The encoding and decoding control part 211 controls the encoding and decoding parts 212 to 217, which are provided in the encoding and decoding module 210, to repeatedly encode and decode the inputted video signal.

It The plurality of encoding and decoding parts 212 to 217 may perform encoding and decoding operations in different ways. Hence, the encoding and decoding module 210 may receive a single video signal, but may output a plurality of video signals which have been encoded and decoded in different ways through the plurality of encoding and decoding parts 212 to 217 (Operation 330).

Through the Operation 330 as described above, a plurality of video signals, which have been encoded and decoded, are outputted from the encoding and decoding module 210 and transferred to the biological information extracting part 220.

In response thereto, the biological information extracting part 220 extracts biological information representing unique features of the respective users from the voice or video signal (Operation 340). In other words, the facial area recognizing part 221 of the biological information extracting part 220 scans the facial area 115 included in the video on the basis of the color, brightness, facial pattern or the like outputted from the encoding and decoding module 210 (refer to FIG. 3*a*). In contrast, the featuring point extracting part 222 recognizes the featuring points 116 through 119 where a face, eyes, a nose, a lip or the like is located using the geometrical information of the scanned facial area (refer to FIG. 3*b*), and then extracts the face featuring information such as the size of the featuring points, ratio, brightness, facial pattern or the like which have been recognized.

The extracted biological information, for example, the face featuring information is inputted into the bio key creating part 230. The bio key creating part 230 generates a bio key by applying an algorithm which creates a specific digital private key from the biological information like the face featuring information (Operation 350).

A plurality of bio keys created by using a plurality of video signals which have been encoded and decoded in different ways as described above are saved in the memory 240 (Operation 350).

2. Video Communication Performing Mode

Figure 5:
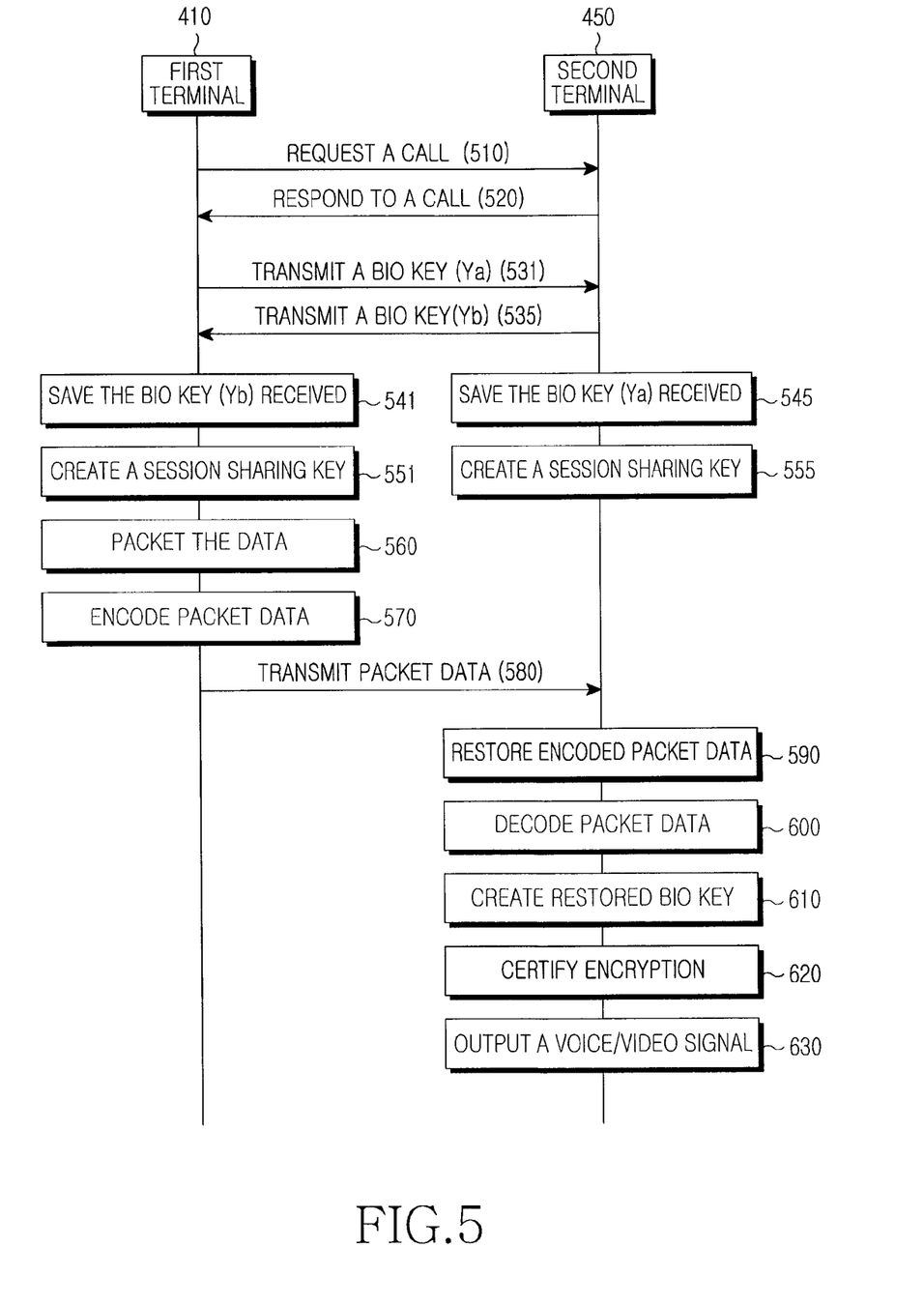
FIG. 5 is a flow chart illustrating a video communication process of the video communication method in accordance with an exemplary embodiment.

FIG. 5 is a flow chart illustrating a video communication process of a video communication method in accordance with an exemplary embodiment. Referring to the video communication apparatus as described above and FIG. 5, when the user first requests video communication among the functions of a first terminal 410, the control part (not shown) controls the telecommunication module 270 to transmit a call request to a second terminal 450 (Operation 510). For instance, the telecommunication module 270 of the first terminal 410 may transmit an INVITE message. In response thereto, the second terminal 450, i.e., the video communication apparatus of the other party, responds to the call (Operation 520). During Operations 510 and 520, the first and second terminals 410 and 450 establish the encoding and decoding method for a voice signal used in the communication such as G 711, G729 method or the like, as well as for a video signal such as MPEG 4, H 264 method or the like.

When a media session begins after the performance of signaling as described above, the session sharing key creating part 250 provided in the first and second terminals 410 and 450 exchange bio keys which have been saved in each device (Operations 531 and 535). The bio keys may be created on the basis of the Diffie-Hellman algorithm, but are not limited to this algorithm.

In the bio key establishing mode as described above, the bio key creating part 230 of the first and second terminals 410 and 450 creates a first bio key (BKa) and a second bio key (BKb), respectively. In contrast, the session sharing key creating part 250 of the first and second terminals 410 and 450 changes the bio keys (BKa, BKb) into first and second converted bio keys (Ya, Yb) for creating the session sharing key, and then exchanges the converted bio keys (Ya, Yb). The first terminal 410 stores the second converted bio key (Yb) (Operation 541) and the second terminal 450 stores the first converted bio key (Ya) (Operation 545). The first and second converted bio keys (Ya, Yb) can be created through the following Equation 1.

$$Ya = pBKa \cdot \mod q; \; Yb = pBKb \cdot \mod q \qquad \text{(Equation 1)}$$

wherein p and q are predetermined constants.

Next, the session sharing key creating part 250 of the first terminal 410 creates a session sharing key by combining the first converted bio key (Ya), which has been changed and saved beforehand in the memory 240 of the first terminal 410, and the second converted bio key (Yb), which has been newly received and saved (Operation 551). For instance, the session sharing key creating part 250 of the first terminal 410 may create a session sharing key (K) through the following Equation 2.

$$K = YbBKa \cdot \mod q = (pBKb)BKa \cdot \mod q \qquad \text{(Equation 2)}$$

Similarly, the session sharing key creating part 250 of the second terminal 450 saves the first converted bio key (Ya) in Operation 545 and creates the session sharing key using the first and second converted bio keys (Ya, Yb) (Operation 555). The session sharing key creating part 250 of the second terminal 450 may create a session sharing key (K) through the following Equation 3. Consequently, the session sharing key creating part 250 of the first and second terminals 410 and 450 creates the same session keys, respectively.

$$K = YaBKb \cdot \mod q = (pBKa)BKb \cdot \mod q \qquad \text{(Equation 3)}$$

After the creation of the session keys is completed, the first terminal 410 begins an SRTP session. That is, when the voice and video data are inputted from the outer input device 110 provided in the first terminal 410 and then transferred to the encoding and decoding module 210, the encoding and decoding control part 211 selects one of the encoding parts, for example the first encoding part 212, which corresponds to the encoding method selected during the call establishing process. Thus, the voice and video data delivered from the outer input device 110 are encoded through the first encoding part 212 and transferred to the telecommunication module 270. Accordingly, the telecommunication module 270 makes a packet of the voice and video data which have been encoded (Operation 560).

Then, the telecommunication module 270 encodes the data which have been made as a packet (referred to as "packet data") using the session sharing key (Operation 570), and then transmits the encoded packet data to the second terminal 450 (Operation 580).

The second terminal 450 receives the encoded packet data through its telecommunication module 270, and then restores the packet data using the session sharing key (Operation 590).

The restored data are transferred to the encoding and decoding module 210, and the encoding and decoding control part 211 selects one of the decoding parts, for example, the first decoding part 213 which corresponds to the encoding method selected during the call establishing process. Thus, the encoded voice and video data inputted from the telecommunication module 270 are decoded through the first decoding part 213 (Operation 600).

The decoded voice and video data go through the encryption certification process before they are transferred to the outer output device 120. In other words, the biological information extracting part 220 extracts the biological information, for example the face featuring information from the voice and video data decoded through the same method as described in the 'bio key establishing mode.' Then, the bio key creating part 230 creates a restored bio key (BKa') using the extracted biological information, for example, the face featuring information and saves them in the memory 240 (Operation 610).

Next, the encryption certifying part 260 compares the restored bio key (BKa') with the first bio key (BKa) which is received during the process of creating the session sharing key, and confirms their coincidences (Operation 620). Furthermore, the encryption certifying part 260 confirms that the encryption certification is successfully performed only if the restored bio key (BKa') is the same as the first bio key (BKa) received.

Finally, if the encryption certification is successfully performed, the decoded voice and video data are transferred to the outer output device 120 and outputted thereafter (Operation 630).

According to the exemplary embodiments, the encryption of the media data can be easily performed in the terminal regardless of the construction of the public key based structure. Further, since the key exchange and certification are performed in the media session, it may be applicable to various signaling protocols. The security of the communication can be maintained because the digital key is created using the user's biological information.

A method according to an exemplary embodiment can be embodied as a computer readable code in computer readable recording media. The computer readable recording media includes all kinds of recording devices in which data readable by the computer system may be saved. Examples of the computer readable recording media include ROM, RAM, CD-ROM, a magnetic tape, a floppy disc, an optical disc or the like. The computer readable recording media may be distributed in a computer system connected to networks, and may be saved and executed as a computer readable code in a distributed method.

While certain exemplary embodiments have been shown and described, it will be understood by those skilled in the art that various changes in form and details may be made therein without departing from the spirit and scope of the appended claims.

What is claimed is:

1. A method for performing communication between a first terminal and a second terminal, the method comprising:
   generating, by the first terminal, a first biographical (bio) key using bio information of a user;
   sending, by he first terminal, an INVITE request message for a video communication to the second terminal;
   receiving, by a first terminal, an INVITE response message in response to the INVITE request message from the second terminal for establishing a session between the first terminal and the second terminal;
   modifying, by the first terminal, the first bio key into a first modified bio key;
   sending, by the first terminal, the first modified bio key to the second terminal;
   receiving, by the first terminal, a second modified bio key from the second terminal;
   generating, by the first terminal, a session shared key using the first modified bio key and the second modified bio key;
   encrypting, by the first terminal, packet data using the session shared key; and
   sending, by the first terminal, the encrypted packet data to the second terminal.

2. The method as recited in claim 1, wherein the generating the first bio key comprises:
   extracting featuring information from the bio information; and
   creating a digital bio key based on the extracted featuring information.

3. The method as recited in claim 1, wherein the generating the first bio key comprises generating a plurality of bio keys corresponding to a plurality of respective encoding and decoding methods.

4. The method as recited in claim 3, further comprising selecting any one encoding and decoding method to be applied to communication, from among the plurality of encoding and decoding methods.

5. The method as recited in claim 1, wherein the session shared key is generated based on a Diffie-Hellman algorithm.

6. The method as recited in claim 1, wherein the bio information comprises face featuring information extracted from a featuring point of the user's face.

7. A first terminal for performing communication between the first terminal and a second terminal, comprising:
   a bio key creating part for generating a first biographical (bio) key using bio information of a user;
   a transmitter for sending an INVITE request message for a video communication to the second terminal, sending a first modified bio key to the second terminal, and sending encrypted packet data to the second terminal;
   a receiver for receiving an INVITE response message in response to the INVITE request message from the second terminal for establishing a session between the first terminal and the second terminal, and receiving a second modified bio key from the second terminal; and
   a controller for modifying the first bio key into the first modified bio key, generating a session shared key using the first modified bio key and the second modified bio key, and encrypting packet data using the session shared key.

8. The first terminal as recited in claim 7, wherein the bio key creating part extracts featuring information from the bio information, and creates a digital bio key based on the extracted featuring information.

9. The first terminal as recited in claim 8,
   wherein the bio key creating part generates a plurality of bio keys corresponding to a plurality of respective encoding and decoding methods.

10. The first terminal as recited in claim 9, wherein the controller is configured to select any one encoding and decoding method to be applied to communication, from among the plurality of encoding and decoding methods.

11. The first terminal as recited in claim 7, wherein the bio information comprises face featuring information extracted from a featuring point of the user's face.

* * * * *